(12) United States Patent
Nelson

(10) Patent No.: US 6,167,902 B1
(45) Date of Patent: Jan. 2, 2001

(54) BOTTOM ENTRY CRYOGENIC VALVE

(76) Inventor: Donald R. Nelson, 118 Monadnock Rd., Worcester, MA (US) 01609

( * ) Notice: Under 35 U.S.C. 154(b), the term of this patent shall be extended for 0 days.

(21) Appl. No.: 09/182,104

(22) Filed: Oct. 27, 1998

(51) Int. Cl.[7] .............. F16K 31/50; F16K 41/04
(52) U.S. Cl. ............. 137/315.4; 137/315.28; 251/214; 251/264; 251/274; 251/368
(58) Field of Search ............. 137/315, 315.27, 137/315.28, 315.4; 251/214, 264, 265, 266, 273, 274, 368, 357

(56) References Cited

U.S. PATENT DOCUMENTS

| | | | |
|---|---|---|---|
| 919,480 | * | 4/1909 | Smith ................... 251/274 |
| 921,981 | * | 5/1909 | Halley .................. 251/274 |
| 949,168 | * | 2/1910 | Andrews ............... 251/273 |
| 1,383,005 | * | 6/1921 | Mertens ................ 251/274 |
| 1,850,850 | * | 3/1932 | Peterson ............... 251/273 |
| 3,048,362 | * | 8/1962 | Scarborough ........ 251/214 |
| 3,404,865 | * | 10/1968 | Nelson ................. 251/214 |
| 3,559,950 | * | 2/1971 | Nelson ................. 251/214 |
| 3,614,058 | * | 10/1971 | Crisp ..................... 251/266 |
| 4,452,427 | * | 6/1984 | Webb .................... 251/214 |
| 4,844,411 | * | 7/1989 | Nelson ................. 251/214 |

FOREIGN PATENT DOCUMENTS

75706 * 3/1919 (DE) ...................... 251/274

* cited by examiner

Primary Examiner—George L. Walton
(74) Attorney, Agent, or Firm—James F. Baird, Esq.

(57) ABSTRACT

An improved bottom entry cryogenic valve, with single piece cast body, that provides for easy and efficient removal of the valve stem and valve seat components without removing the valve body from the fluid circuit. The valve body forms the housing and has a top end, a main body section and a bottom entry end. The main body section has fluid entry and fluid exit openings. A bonnet nut is attached to the valve body top end. A body ring is attached at the bottom entry end. A valve stem extends axially through the bonnet nut, with a top portion exposed with a hand wheel attached thereon. The valve stem has a mid portion, a flange portion and a threaded bottom end located in the main body section of the valve body. The valve stem mid portion supports a valve seal member and a seal nut/bearing. The valve seal member is to prevent fluid from flowing through the valve body when the valve is in a closed position. The seal nut/bearing acts to restrict fluid from entering the top end portion of the valve body. The body ring acts to seal the valve body at the bottom entry end. The valve stem together with valve seal and seal nut/bearing supported thereon may be removed, as a unit, for repair or replacement.

4 Claims, 5 Drawing Sheets

BOTTOM ENTRY CRYOGENIC VALVE

BACKGROUND OF THE INVENTION

1. Field of the Invention

The present invention relates to a bottom entry valve for use with fluid at cryogenic temperatures.

2. Description of Related Art

High performance valves, particularly for use at cryogenic temperatures, require precisely fabricated internal valve components to ensure proper closure of the valve without the likelihood of leakage. Thus, it is often necessary to have easy access to the internal valve components for repairs and other maintenance. Cryogenic valves also face an increased possibility of cryogens escaping through relatively small openings due to substantial shrinkage of the valve components when subjected to cryogenic temperatures.

Traditionally, bottom entry valves have been developed to provide ready access to the internal valve components without the need to physically remove the entire valve from the fluid line or piping. Typically, a bottom entry valve involves an assembled valve body which once constructed results in a unit with a top end, a bottom entry end and a main body section. The use of several components with their related seals and means of assembly such as welding and brazing increases the possibility of leaks.

The top end of the valve body is provided with an opening, the bottom entry end of the valve body is also provided with an opening. The top end opening is sized and shaped to permit the top portion of the valve stem to extend therethru. A hand wheel is usually attached to the top end of the valve stem. The top end of the valve body is typically sealed with a removable bonnet nut acting in conjunction with a system of springs, packing set and bearing. The bottom entry end opening is sized to be relatively large. The bottom entry end opening is sealed with a removable body ring acting in conjunction with a gasket. At a predetermined position on the main body section of the valve an inlet and an outlet are provided. The valve stem supports the valve seal member and seal nut. The valve seal member acts to permit a flow of fluid from the inlet to the outlet when the valve stem is in a first or open position and prohibits any flow when the valve stem is in a second or closed position. The valve seal member acts as a seal when the valve stem is in the second or closed position. The valve seal member is secured in a desired position by the seal nut. A valve stem bearing is provided to permit easy rotation of the valve stem and also to insure that the valve stem does not make contact with the interior of the valve body. A retaining ring is provided to keep the valve stem bearing in a desired position. The valve stem bearing and retaining ring are supported by the valve body. The size of the bottom entry end opening is large enough to permit the valve stem, valve seal member, seal nut, valve stem bearing and retaining ring to be installed and removed. In the traditional bottom entry valves that are available, in order to perform maintenance, it is necessary to first remove the valve stem together with the valve seal member and seal nut from within the valve body, then remove the retaining ring and the valve stem bearing from within the valve body. The removal of all of these internal components of the valve involve several steps. It may be necessary to remove all of the components in order to remove the one component that is causing a problem. In the existing art the removal of the stem and related components is performed in order that a malfunction be corrected. This means that the valve is still connected to the fluid line or piping. In order to remove the retaining ring or valve stem bearing special tools are required. The use of tools to remove these items may cause damage to the valve body sealing surfaces resulting in leaks.

The present invention provides an improved bottom entry cryogenic valve.

One of the objects of the invention is to provide an improved bottom entry cryogenic valve that has a single unit valve body with no brazements or weldments.

Another object of the invention is to provide an improved bottom entry valve that combines the seal nut, retaining ring and valve stem bearing into a seal nut/bearing, reducing the number of internal components.

A further object of the invention is to provide an improved bottom entry cryogenic valve that has the valve seal member, and seal nut/bearing supported on the valve stem.

A still further object of the invention is to provide an improved bottom entry cryogenic valve that allows for removal of the valve stem, valve seal member and seal nut/bearing as a unit.

An additional object of the invention is to provide an improved bottom entry cryogenic valve that eliminates leakage by utilizing a one piece cast body. When combined with a valve stem that supports the valve seal and seal nut/bearing easy removal is accomplished in one step for repair or replacement.

The one piece body can be cast so that the inlet and outlet extensions are long enough to insulate the soft seals in the valve from heat generated when the complete valve is welded into the pipeline.

With these and other objects in view, as will be apparent to those skilled in the art, the invention resides in the combination of parts set forth in the specification and covered by the claims appended hereto.

SUMMARY OF THE INVENTION

This is an improved bottom entry valve for use at cryogenic temperatures. In the present invention the housing for the valve is formed by a single piece cast body. The single piece cast body eliminates the welding or brazing of several connections. In addition the present invention combines the seal nut, retaining ring and valve stem bearing into a single member entitled seal nut/bearing. The present invention further provides that the valve stem supports the valve seal and the seal nut/bearing. By having the seal nut/bearing supported by the valve stem the invention allows for removal of the valve stem, valve seal member and seal nut/bearing in one step as a unit. In addition the seal nut/bearing has greater surface areas in contact with both the valve stem and the internal sealing surface of the single piece cast body. These improvements to the bottom entry cryogenic valve substantially reduce the possibility of leakage and in addition provides for a quick, easy and more efficient removal of the valve stem, valve seal member and seal nut/bearing for repair or replacement. The result is a significant reduction of downtime for the valve during repair or replacement of the valve stem, valve seal member or seal nut/bearing. The removal of the valve stem and parts supported thereon further allows for complete inspection of the internal sealing surfaces of the single unit cast valve body.

The single piece cast body is preferably made of austenitic stainless steel. The typical valve stem bearing is made of bronze, the typical retaining ring is made of beryllium copper and a typical valve seal member nut is made of brass. In the present invention the seal nut/bearing that replaces the seat nut, retaining ring and valve stem bearing is made of free cutting brass. Obviously other materials suitable for use at cryogenic temperatures may be used for the seal nut/bearing. The seal nut/bearing is supported by the mid portion of the valve stem. The seal nut/bearing acts to insure that the mid portion of the valve stem does not make contact with the internal surfaces of the single piece cast valve body. The seal nut/bearing is formed in the shape of an elongated tubular member. The seal nut/bearing is formed as a cylinder and has an internal surface with two portions, the top portion and the bottom or nut portion. The top portion having a diameter that is sized and shaped to permit the valve stem to support the seal nut/bearing securely. The bottom or nut portion has formed threads with an outside flange. The threads are sized to engage with threads on the mid portion of the valve stem. The seal nut/bearing outer surface has four sections, the top bearing section, the mid sleeve section, the nut section and a flange section. The seal nut/bearing outer surface sections are sized and shaped to fit within the single piece cast valve body, making appropriate contact, permitting movement and restricting the flow of liquid.

While the invention will be discussed in connection with a preferred embodiment, it will be understood that there is no intention to limit the invention to this embodiment. On the contrary, it is the intention to cover all alternatives, modifications and equivalents as may be included within the spirit and scope of the invention as defined by the appended claims.

BRIEF DESCRIPTION OF THE DRAWINGS

The object and features of the invention may be understood with reference to the following detailed description of an illustrative embodiment of the invention, taken together with the accompanying drawings in which.

DESCRIPTION OF THE PREFERRED EMBODIMENT

Figure 1:
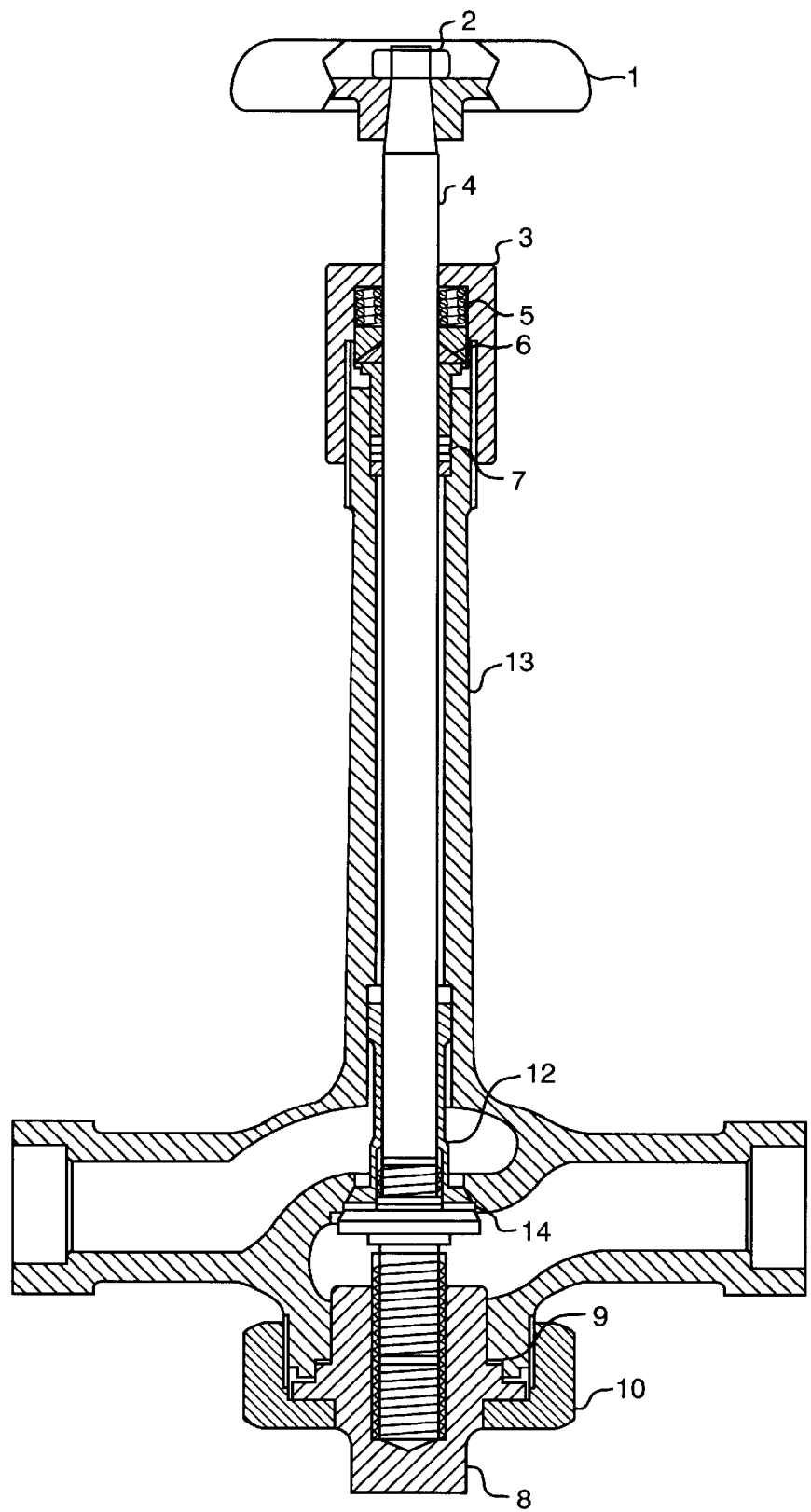
FIG. 1. shows the present invention, the Bottom Entry Cryogenic Valve. Shown is a cutaway view of the single piece cast body 13, indicating the internal components including; the valve stem 4, the seal nut/bearing 12 and the valve seal member 14. Also shown are the following components; handwheel 1, hand wheel nut 2, bonnet nut 3, springs 5, bearing 6, packing set 7, stem bushing 8, gasket 9 and body ring 10. The valve is shown in a closed position.
Figure 2:
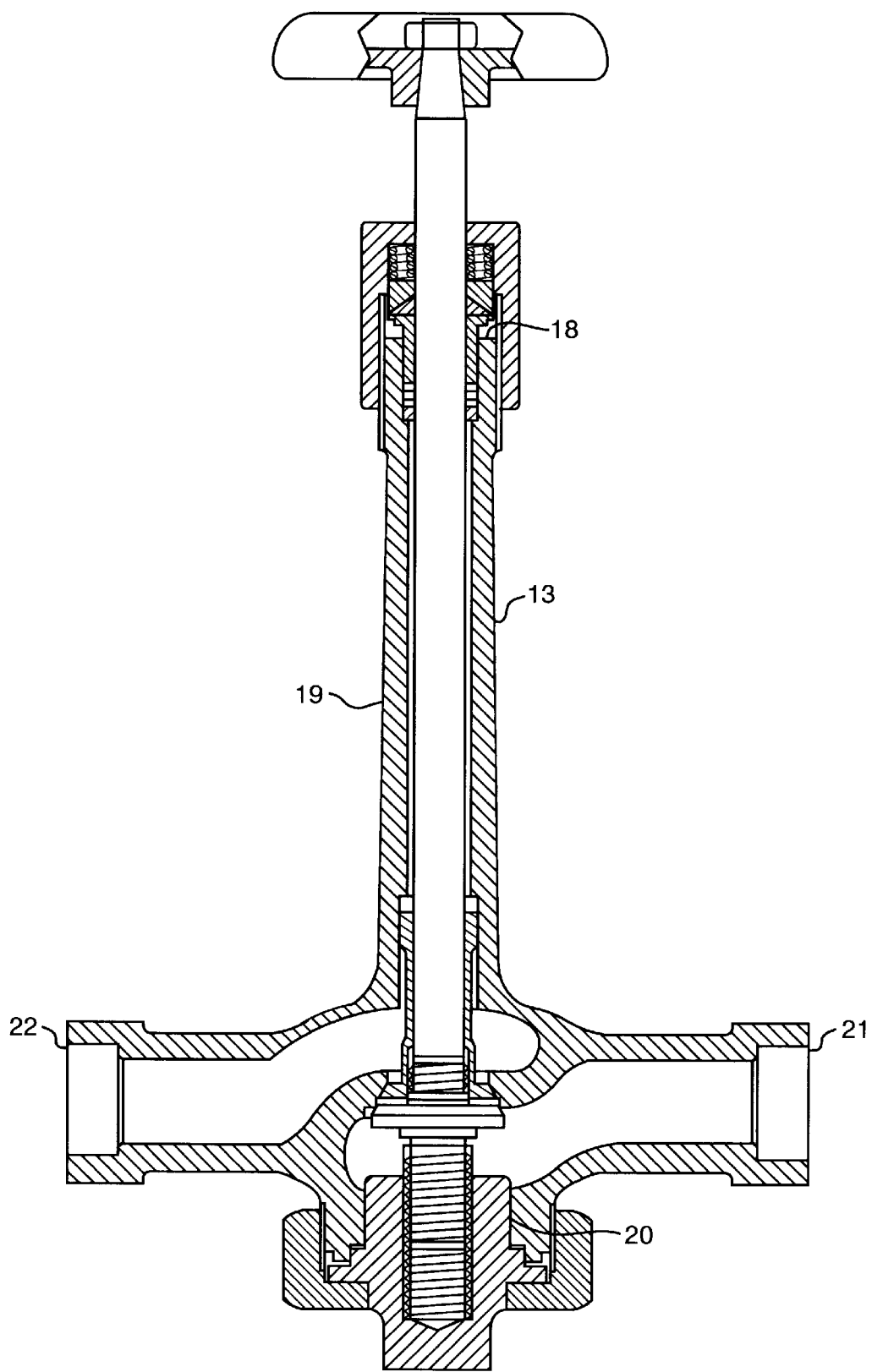
FIG. 2. shows a second cutaway view of the single piece cast body 13, indicating top end 18, main body section 19, bottom entry end 20, fluid entry opening 21 and fluid exit opening 22.
Figure 3:
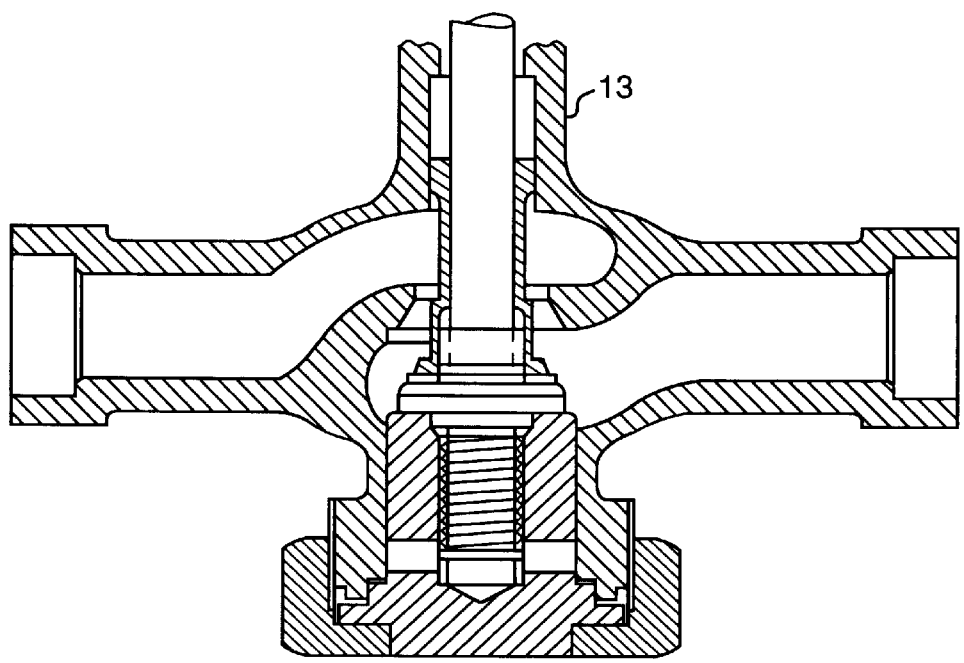
FIG. 3. shows a partial cutaway view of the invention in an open position.
Figure 4:
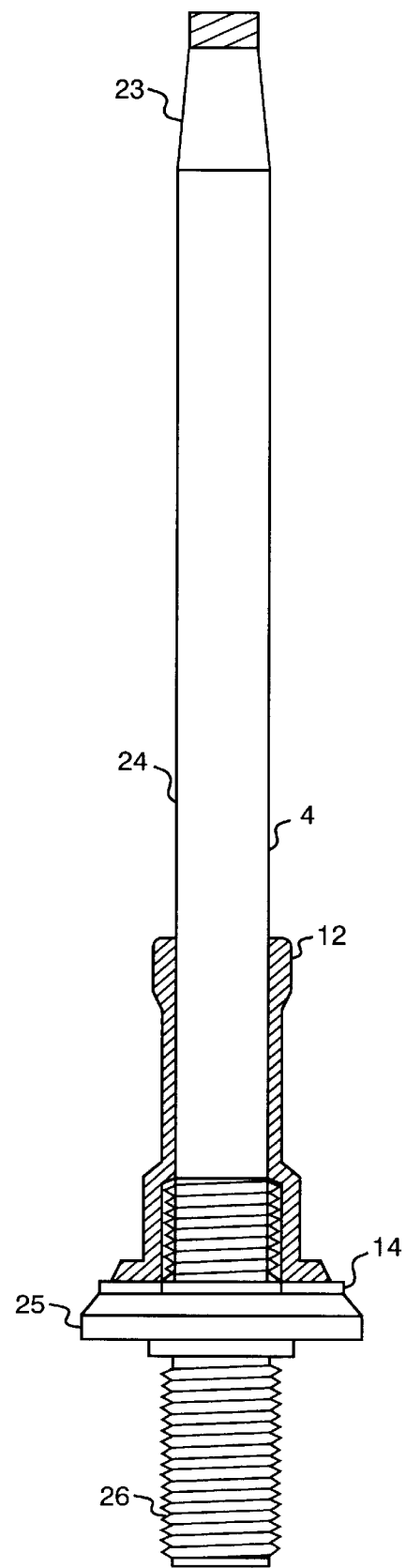
FIG. 4. shows a view of the valve stem 4. Shown is the valve stem 4, with the seal nut/bearing 12 and valve seal member 14 supported thereon. Also shown are valve stem top portion 23, valve stem mid portion 24, valve stem flange portion 25 and the valve stem threaded bottom end 26.

Turning first to FIG. 1 there is shown the present invention, the Bottom Entry Cryogenic Valve. Shown is a cutaway view of the valve body 13. The Valve body is a single piece cast body and as one can see there are no welded or brazed joints or connections. FIG. 1 also indicates the internal components. Shown is the valve stem 4, supporting the seal nut/bearing 12 and the valve seal member 14. The valve is shown in a closed position. FIG. 3 shows a partial view of the valve in an open position. It should be noted that the valve stem is in a first or open position in FIG. 3 and in a second or closed position in FIG. 1. As the handwheel 1 is rotated the threads located on the threaded bottom end of the valve stem 26 mechanically react with threads in the stem bushing 15 causing the valve stem to move from a first or open position FIG. 3 to a second or closed position FIG. 1, or from a second or closed position FIG. 1 to a first or open position FIG. 3. The seal nut/bearing 12 and valve seal member 14 are supported on the valve stem 4 and travel with the valve stem as a unit. The result is that the valve stem flange portion 25 is thrust against the valve seal member 14 which in turn is thrust against the valve body 13 when the valve stem 4 is in a second or closed position FIG. 1. The feature of the invention that is unique is that when the valve stem 4 is removed from the valve body 13, as shown in FIG. 4. the seal nut/bearing 12 and valve seal member 14 accompany the valve stem 4 as a unit. The result is that the valve stem bearing and retaining ring that are used in conventional bottom entry valves that are replaced by the seal nut/bearing 12 are not left within the valve body 13 to be removed separately.

Figure 5:
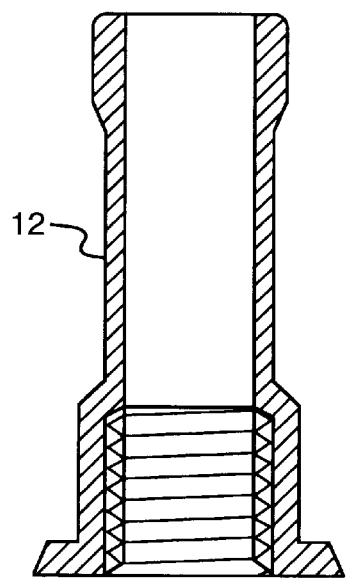
FIG. 5. shows a cutaway view of the seal nut/bearing 12.
Figure 6:
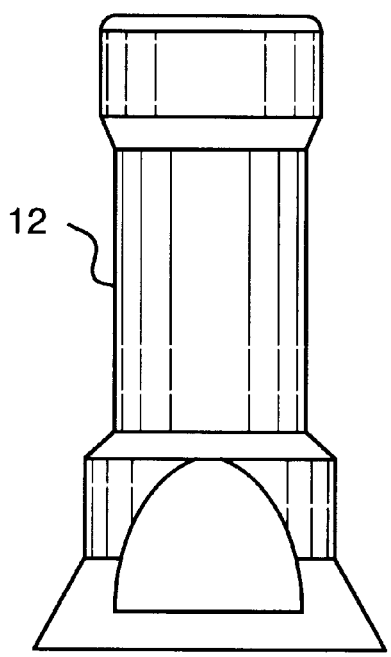
FIG. 6. shows a side plan view of the seal nut/bearing 12.
Figure 7:
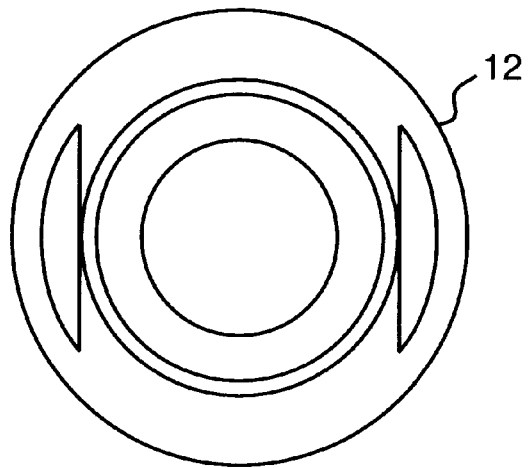
FIG. 7. shows a top plan view of the seal nut/bearing 12.

FIGS. 5, 6 and 7 show the seal nut/bearing 12. There are two flattened areas on opposite sides of the seal nut/bearing 12 for use with a tool to aid in securing the seal nut/bearing 12, as well as the valve seal member 14, to the valve stem 4. This is achieved by threads on the internal surface of the seal nut/bearing 12 acting together with threads on the valve stem mid portion 24.

From the foregoing description it will be apparent that modifications can be made to the apparatus without departing from the teaching of the present invention. Accordingly, it is distinctly understood that the invention is not limited to the preferred embodiment but may be embodied and practiced within the scope of the following claims.

What is claimed is:

1. New and improved Bottom Entry Cryogenic Valve comprising:

a) a single piece cast body, with no brazing or weldments, having an outer surface and an inner surface, said inner surface forming a housing having a top end, a main body section and a bottom entry end, the top end having a diameter that is smaller than the diameter of the bottom entry end, the main body section having a fluid entry opening and a fluid exit opening;

b) a removable stem bushing sized and shaped to fit within the said single piece cast body bottom entry end having a cavity with a threaded surface facing toward the said single piece body inner surface;

c) a valve stem having a top portion, a mid portion, a flange portion and a threaded bottom end, said valve stem mid portion having threads on a portion, said valve stem being supported partially within the single piece cast body with the valve stem top portion extending from the single piece cast body top end, and the valve stem mid portion, valve stem flange portion and valve stem threaded bottom end located within the single piece cast body main body section, said valve stem threaded bottom end being threadedly received within said removable stem bushing cavity that permits actuation from a first or open position to a second or closed position;

d) a seal nut/bearing formed in the shape of an elongated tubular member, being a cylinder having an internal surface and an outer surface, the internal surface has two portions, a top portion and a bottom or nut portion, the seal nut/bearing top portion having a diameter that is sized and shaped to permit the valve stem to support the seal nut/bearing securely, the seal nut/bearing bottom or nut portion having threads with a diameter that is greater than the diameter of the seal nut/bearing top portion, the threads are sized and shaped to engage frictionally with the threads on the valve stem mid portion, the seal nut/bearing outer surface has four sections, a top bearing section, a mid sleeve section, a nut section and a flange section, the valve nut/bearing outer surface is sized and shaped to fit within the single piece cast body main body section making contact, and yet permitting movement; and e) a valve seal member sized and shaped to be supported on the valve stem mid portion below the seal nut/bearing and above the valve stem flange portion, and also sized and shaped to not engage the single piece cast body inner surface when the valve stem is in a first or open position and to engage the single piece cast body inner surface when the valve stem is in a second or closed position.

2. New and improved Bottom Entry Cryogenic Valve as described in claim 1, where the single piece cast body is made of stainless steel.

3. New and improved Bottom Entry Cryogenic Valve as described in claim 1, where the seal nut/bearing is made of brass.

4. New and improved Bottom Entry Cryogenic Valve as described in claim 1, where the single piece cast body is made of stainless steel and the seal nut/bearing is made of brass.

* * * * *